Jan. 5, 1943.　　　G. F. HANDLEY　　　2,307,268
TYPEWRITING MACHINE
Filed Oct. 3, 1941　　　4 Sheets-Sheet 1
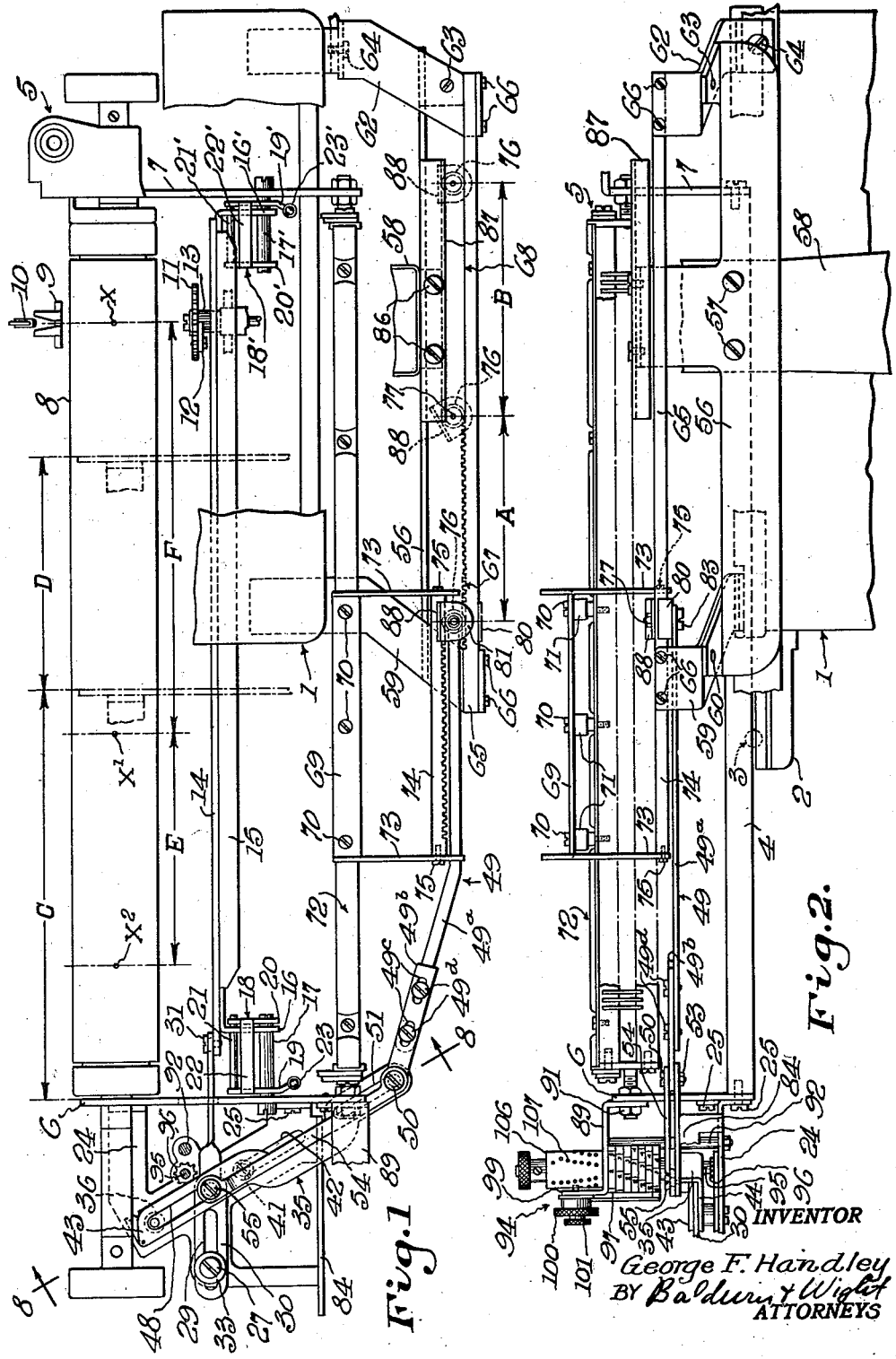
INVENTOR
George F. Handley
BY Baldwin & Wight
ATTORNEYS

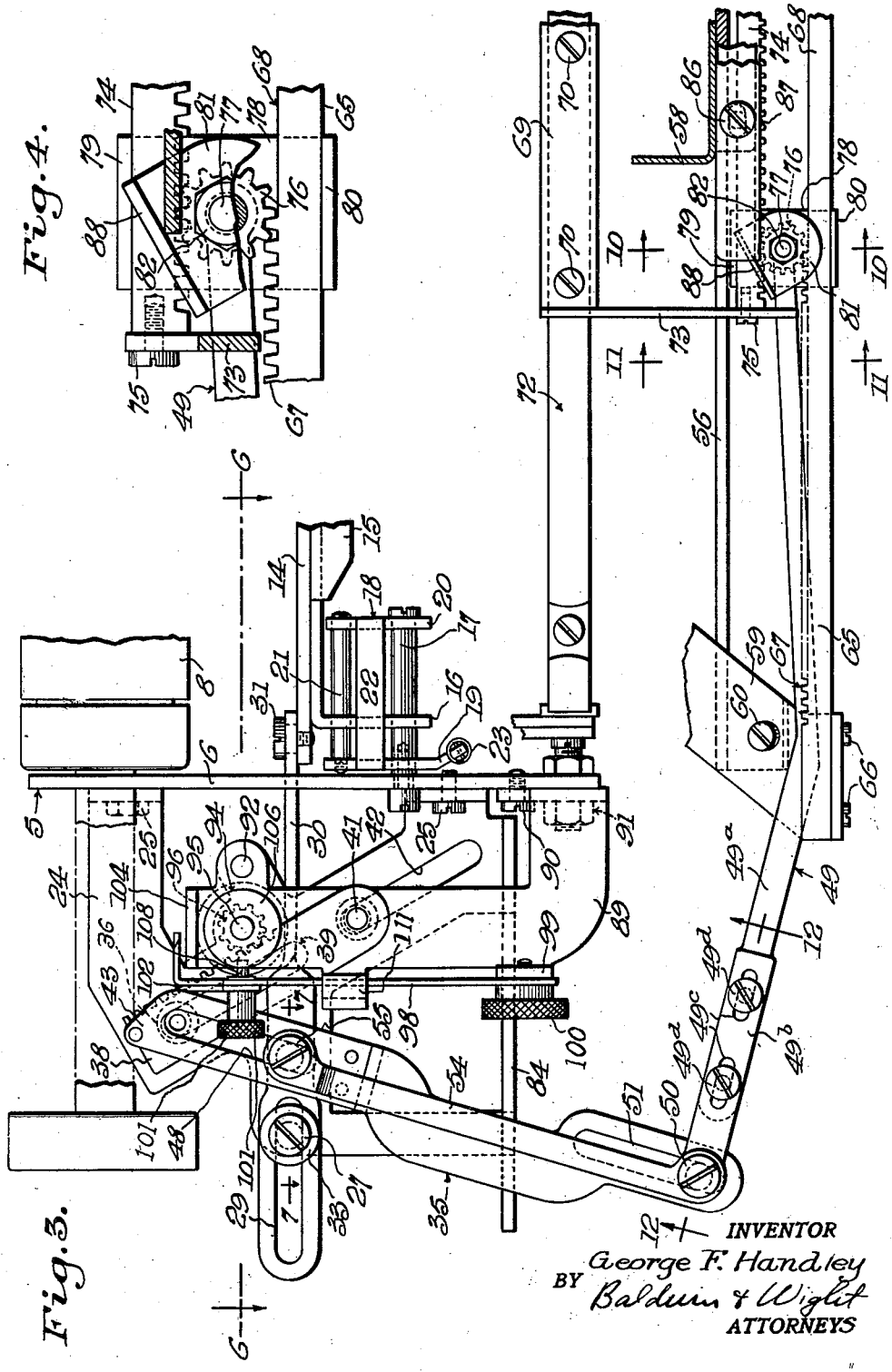

Jan. 5, 1943.  G. F. HANDLEY  2,307,268
TYPEWRITING MACHINE
Filed Oct. 3, 1941  4 Sheets-Sheet 3
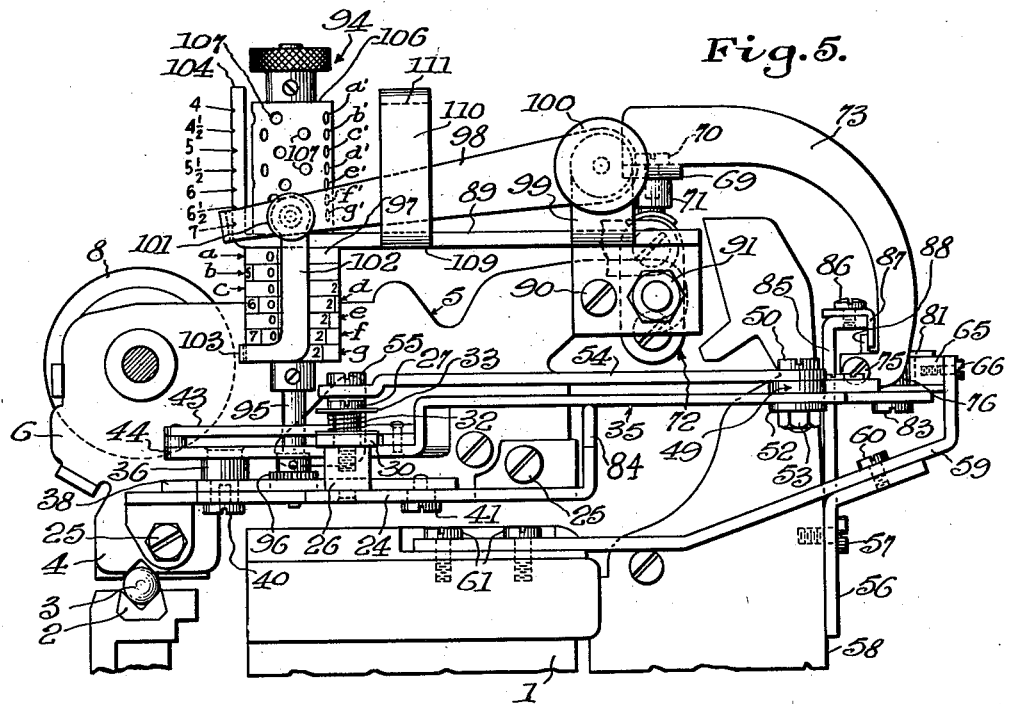
Fig. 5.
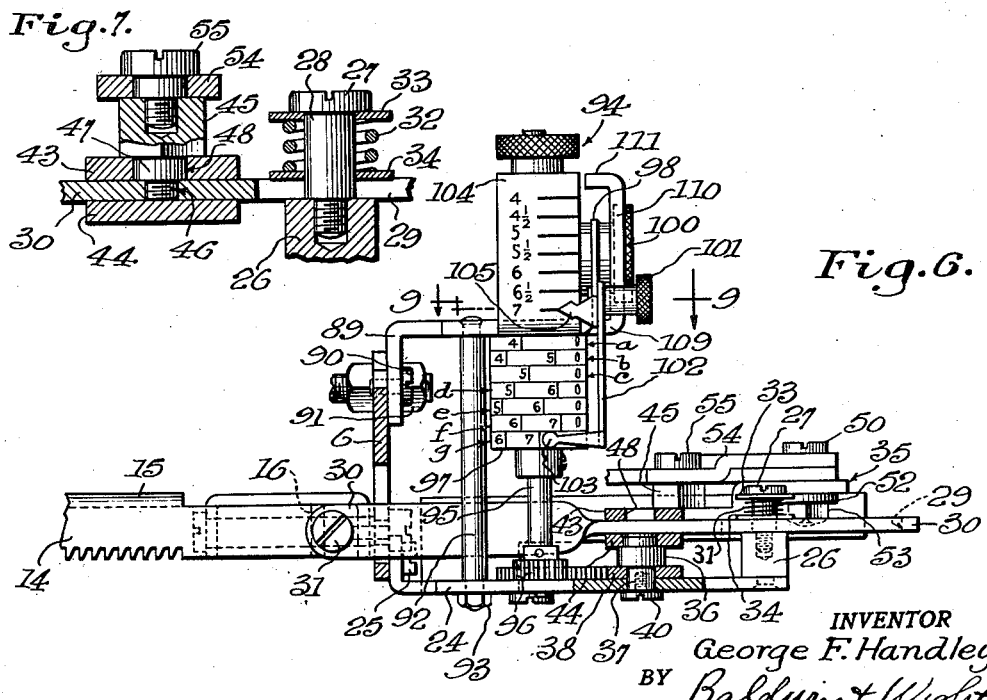
Fig. 7.
Fig. 6.
INVENTOR
George F. Handley
BY Baldwin & Wight
ATTORNEYS Jan. 5, 1943.　　　　G. F. HANDLEY　　　　2,307,268
TYPEWRITING MACHINE
Filed Oct. 3, 1941　　　4 Sheets-Sheet 4
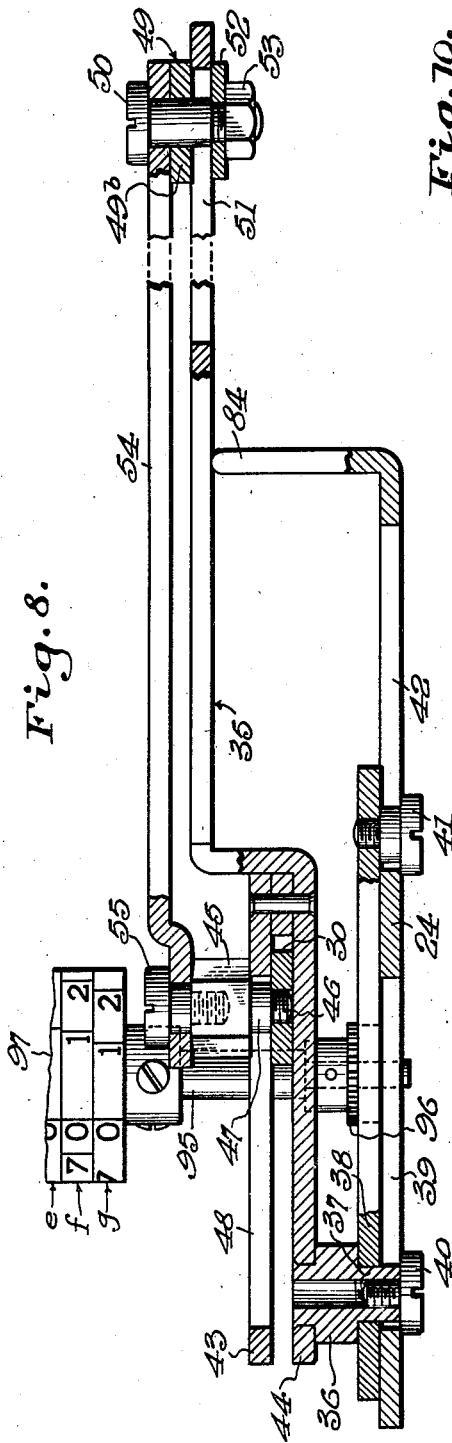
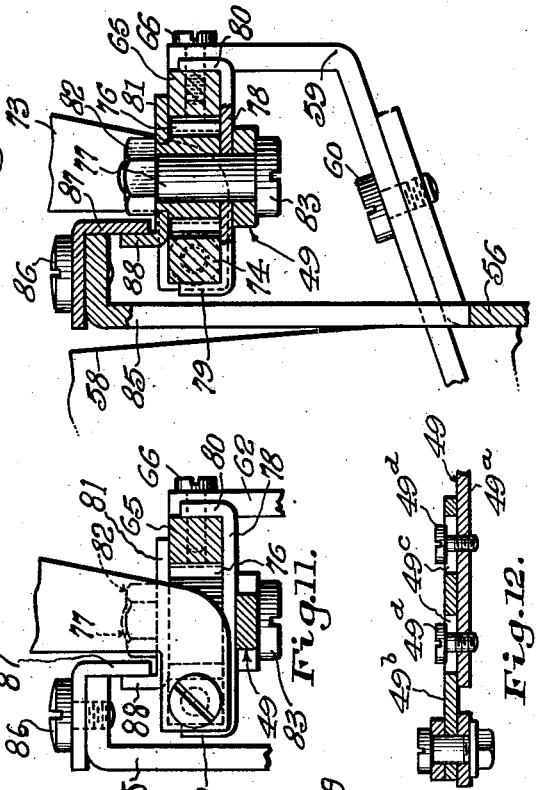
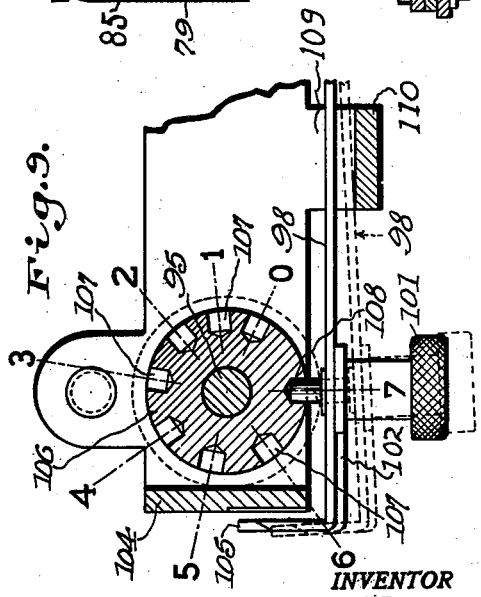
INVENTOR
George F. Handley
BY Baldwin & Wight
ATTORNEYS Patented Jan. 5, 1943

2,307,268

UNITED STATES PATENT OFFICE 2,307,268

TYPEWRITING MACHINE

George F. Handley, Glendale, N. Y., assignor to Royal Typewriter Company, Inc., New York, N. Y., a corporation of New York Application October 3, 1941, Serial No. 413,519

19 Claims. (Cl. 197—84)

This invention relates to typewriting machines and more particularly to mechanism for variably and selectively controlling the lengths of the step-by-step letter-spacing incremental carriage movements to "justify" typed lines, or, in other words, to uniformly distribute or space a known number or numbers of letter-spacing increments throughout the whole or predetermined portions of one or more typed lines in such a way that all of the lines will end at the right in substantial vertical alignment to establish a uniform margin at the right hand side of a work sheet. Mechanism for accomplishing this broad purpose is disclosed in United States Letters Patent 2,196,437, granted to George F. Handley April 9, 1940.

In the mechanism disclosed in the prior patent, line justification is effected by moving the carriage escapement rack differentially with respect to the carriage movement. This is accomplished by rocking of a multiplying lever which traverses and has combined pivotal and sliding connection with the rack bar, and pivotal connection to the carriage. An end of the multiplying lever has a shiftable fulcrum connection with a bracket secured to and extending rearwardly from the main frame. The arrangement is such that when the carriage travels in the letter-spacing direction, the multiplying lever is rocked about its pivot on the carriage to move the escapement rack relatively to the carriage and opposite the letter-spacing movement. The present invention provides improvements in the mechanism disclosed in the prior patent and among these improvements is the particular adaptability of the new justifying mechanism to typewriters having long platens and long carriage travel.

An object of the invention is to provide justifying mechanism so constructed and arranged as to be applicable to typewriters having carriages of any length without necessitating the use of parts projecting far from the typewriter proper, that is, to provide justifying mechanism adapted to be applied to typewriters having carriages of any length with a minimum increase in the overall dimensions of the entire machine.

Another object is to provide mechanism adapted to carry out the justification throughout only a portion of a typed line, the remaining portion of the line having the normal or usual letter-spaces.

A further object is to provide a simple, compact, and effective differential driving device for operating line justifying mechanism. Other objects will become apparent from a reading of the following description of an illustrative embodiment of the invention, the appended claims, and the accompanying drawings, in which:

Figure 1 is a plan view, somewhat diagrammatic, showing such conventional typewriter parts as will assist in an understanding of the invention, and justifying mechanism embodying the invention applied thereto, the parts being shown in the positions occupied before the typing of a line and before justifying operation;

Figure 2 is a rear elevation of the structure shown in Figure 1;

Figure 3 is a fragmentary plan view, on an enlarged scale, showing justifying mechanism in the positions occupied after justifying operation;

Figure 4 is a fragmentary view on an enlarged scale, partly in section and partly in elevation, showing parts of a differential mechanism for driving or operating the justifying apparatus;

Figure 5 is an end elevation with a platen shaft shown in vertical section;

Figure 6 is a fragmentary front view mainly in elevation but with a carriage end plate and some parts adjacent the bottom of the figure being shown in vertical section on the line 6—6 of Figure 3.

Figure 7 is a detailed section on the line 7—7 of Figure 3, and drawn on an enlarged scale;

Figure 8 is an enlarged section on the line 8—8 of Figure 1;

Figure 9 is an enlarged horizontal section on the line 9—9 of Figure 6;

Figure 10 is a transverse, vertical, section on the line 10—10 of Figure 3, drawn on an enlarged scale;

Figure 11 is a transverse vertical section on the line 11—11 of Figure 3, drawn on an enlarged scale; and Figure 12 is a detailed vertical section on the line 12—12 of Figure 3.

Mechanism embodying the invention may be used in connection with typewriters of different constructions. For the purposes of illustration, justifying mechanism constructed in accordance with the present invention is shown as being applied to a typewriter having generally the construction of the well known Royal standard typewriter. The drawings show a main frame 1 equipped with a bottom rail 2 grooved for receiving ball bearings 3 which support a rail 4 forming part of a carriage 5 mounted to travel longitudinally for letter-spacing and carriage return. The carriage is provided with the usual end plates 6 and 7 between which a platen or cylinder 8 is mounted. Figure 1 shows the parts in the positions occupied just prior to the starting of typing, the carriage being disposed at the operator's right, and the left hand end portion of the platen being positioned in front of a type bar guide 9. A type bar 10 is shown as being just ready to enter the guide 9 and move to printing position. The carriage may be urged to the left in the usual manner by a spring motor and draw band (not shown) under the control of escapement mechanism including an escapement wheel 11 carrying a pawl 12 engaging an escapement pinion 13 which in turn meshes with an escapement rack bar element 14. The parts described thus far may all be of known or conventional construction.

The rack bar 14 is secured to a bail 15 formed with arms 16 and 16' pivotally mounted, respectively, on studs 17 and 17' in turn carried, respectively, by the end plates 6 and 7. A yoke 18 comprises outer and inner arms 19 and 20 pivotally mounted on the stud 17, a tie pin 21 extending under the bail arm 16 and a tie bar 22 extending over the bail arm 16. Similarly, a yoke 18' includes outer and inner arms 19' and 20', a tie pin 21' connecting the arms 19' and 20' and extending under the bail arm 16', and a tie bar 22' connecting the arms 19' and 20' and extending above the bail arm 16'. Coil springs 23 and 23' connected, respectively, to the yoke arms 19 and 19', tend to rock the yokes 18 and 18' and cause the tie bars 22 and 22' to press downwardly on the bail arms 16 and 16' so as to hold the rack bar 14 in mesh with the escapement pinion 13. The springs 23 and 23', however, are yieldable to permit raising of the rack 14 to disengage it from the pinion 13 upon operation of a carriage release member (not shown).

In operation, when the carriage is moved in the letter-spacing direction, mechanism described hereinafter causes the rack 14 to move relatively to the carriage opposite the direction of letter-spacing movement so as to increase the length of each letter space increment. The rack bail arms 16 and 16' are adapted to slide on the pins 17 and 17', respectively, to permit this movement of the rack relative to the carriage. The clearance between the bail arms 16 and 16' and the yoke arms 19 and 20', respectively, is sufficient to enable the rack to move far enough to effect a justification equivalent to as much as seven spaces within a writing line length of from four to seven inches.

Figure 3 shows the position of the rack 14 and bail 15 relative to the carriage just before completion of the justifying movement of the rack, and it will be seen that there is ample clearance between the rack bail arm 16 and the yoke arm 19.

Some parts of the mechanism for moving the rack bar 14 relative to the carriage are supported on a bracket 24 secured by screws 25 to the right-hand carriage end plate 6. (The "right-hand" end plate is shown at the left in Figures 1, 2 and 3.) A post 26 secured to the bracket 24 adjacent the outer end thereof receives a shoulder screw 27 having a shank 28 which passes through a slot 29 formed in an arm 30 having a horizontal pivot connection 31 to the rack bar 14, the arm 30 being longitudinally aligned with the rack bar so as to form a continuation thereof. The arrangement is such that the arm 30 can slide longitudinally, its outer slotted end being guided by the screw shank 28, post 26, and resilient means for holding the arm 30 down on the post 26. In the form shown, this resilient means comprises a spring 32 interposed between a washer 33 under the head of the screw 27, and a washer 34 arranged to bear on the top of the arm 30. The screw 31, by pivoting the rack 14 and arm 30 to rock relatively about a horizontal axis, permits the slight upward movement of the rack 14 required to free it from the escapement pinion 13. Inasmuch as the rack 14 and arm 30 do not move with respect to each other during normal operation, they function during justification as a single element. Accordingly, it is intended that the term "rack bar" may include the arm 30 as well as the rack proper 14.

Mounted on the bracket 24 is an operating member or lever 35, rocking of which by means to be described later is adapted to move the rack bar 14—30 relatively to the carriage for effecting the desired letter space justification. In the form shown, the lever 35 traverses the arm 30 and is equipped with a pivot stud 36 having a reduced lower end portion 37 which extends through and beyond an aperture adjacent one end of a rack plate 38 and then into a slot 39 in the bracket 24. A cap screw 40 having threaded connection with the stud 36 maintains the latter against upward movement relative to the bracket 24. A shoulder screw 41 extends through another slot 42 in the bracket 24 and has threaded connection with the other end of the rack plate 38. Thus, the rack plate 38 is mounted to slide fore and aft and to be guided by the slots 39 and 42 in the bracket 24, the purpose of such sliding being to vary or adjust the amount of letter space justification, as will be explained hereinafter.

The front end of the lever 35 is of bifurcated construction and includes upper and lower arms 43 and 44, respectively, between which the arm 30 extends. A stud 45 has its lower end 46 in threaded connection with the rack bar arm 30, and has a shank or pivot pin 47 received in a slot 48 in the top arm 43 of the lever 35.

In operation, and assuming that the parts are in the positions shown in Figure 1 before the typing of a line is commenced, the carriage will be advanced in the letter-spacing direction under the control of the escapement mechanism operated in the usual manner in response to type bar actuation. Means later to be described will function during at least a portion of the carriage letter-spacing travel to rock the lever 35 counterclockwise, as viewed in Figure 1, and progressively during the carriage letter-spacing travel. The lever 35 will rock about the pivot 36 which may be considered as fixed with respect to the carriage, and the inner wall of the slot 48 will bear against the shank 47 of the stud 45 so as to move the arm 30 and rack bar 14 opposite the direction of carriage letter-spacing travel. By such movement of the rack 14 relative to the carriage, the length of each letter-spacing increment is increased and, by selecting and determining the proper amount of such increase, the desired justification can be achieved. The construction described thus far is similar, in general, to the construction disclosed in the prior United States Patent 2,196,437 previously referred to. The present invention relates more particularly to mechanism which is described hereafter, and to combinations of such mechanism with the known structure hereinabove referred to.

In accordance with the present invention, the lever 35 is operated during carriage letter-spacing movement by a driving member arranged to perform a compound movement, both together with and simultaneously with respect to the carriage, the arrangement being such that the driving member moves only a fraction of the distance through which the carriage moves during any typing operation. In the form shown, the driving member comprises a link generally designated 49 mounted to move bodily and substantially rectilinearly and parallel to the direction of carriage travel. At its right-hand end (left-hand end as viewed in Figure 1), the link 49 is connected to the lever 35 by a pivot pin 50 which extends through an aperture in the link and through a slot 51 in the lever 35, the pin 50 being provided with a washer 52 and nut 53 for holding the pin against upward movement. It is desirable that the pivot pin 50 be maintained at a constant distance from the combined pivotal and sliding connection between the rack bar arm 30 and lever 35, which combined pivotal and sliding connection is provided by the stud shank 47 and slot 48 in the lever 35. For accomplishing this purpose, a link 54 has its rear end pivotally connected to the link 49 by means of the pivot pin 50, and has its front end pivoted on the stud 45 by means of a shoulder screw 55. This construction insures that the active connection between the link 49 and lever 35 will always be maintained at a constant distance from the active connection between the rack bar arm 30 and lever 35.

The end of the link 49 remote from the pin 50 forms part of, or is connected with, a differential drive mechanism responsive to carriage letter-spacing movement for rocking the lever 35 about its pivot 36. In the embodiment of the differential drive mechanism shown for the purposes of illustration, a bracket 56 is mounted by screws 57 on a tabulator finger cover 58. A bracket arm 59 is secured by a screw 60 to the bracket 56, and is secured by screws 61 to the main frame 1. Another bracket arm 62 is secured by a screw 63 to the bracket 56 and is secured to the main frame 1 by a screw 64. The bracket arms 59 and 62 support a rod 65 secured to the arms 59 and 62 by screws 66, the rod 65 extending longitudinally of the typewriter parallel to the direction of carriage travel and including a toothed portion 67 and a smooth untoothed portion 68. Another bracket 69 mounted by screws 70 and spacers 71 on a tabulator stop assembly 72 is provided with arms 73—73 which support a companion toothed rod 74 secured to the arms 73—73 by screws 75. The rod 74 is spaced from and parallel to the rod 65, the teeth on the rods facing toward each other.

When the carriage is positioned at the end of its return movement preparatory to beginning a line of typing, the toothed rod or rack 74 partially overlaps the toothed portion 67 of the rod 65, as shown in Figure 1. Interposed between and simultaneously engaging both the toothed rod 74 and the toothed portion 67 of the rod 65 is a pinion 76 having an axle or pintle 77 which is connected to the link or driving member 49. Retainers are provided to maintain the pinion against lateral displacement. In the form shown, a retainer yoke 78 is secured below the pinion 76 and bars 65 and 74, the axle 77 passing through the yoke, the arrangement being such that the pinion 76 can turn freely with respect to the yoke. The yoke is formed with flanges 79 and 80 which extend upwardly in contact with the outer faces of the bars 74 and 65. A top retainer 81 is fixed to the pinion 76 by a nut 82 so as to turn therewith, and overlies the top faces of the rods 65 and 74. The pinion 76, axle 77, yoke 78, and top retainer 81 are held in assembled relation by the nut 82 threaded on the upper end of the axle and a head 83 integral with the axle at its bottom end. It will be observed that the driving member or link 49 is supported entirely by its connections to the pinion 76 and the multiplying lever 35 respectively. In order to prevent too great a downward flexing of the lever 35, the bracket 24 is provided with a flange 84 the upper edge of which is horizontal and is disposed so as to support the lever 35 intermediate its ends.

In operation, and assuming that the typing of a line is commenced when the parts are positioned as shown in Figure 1, movement of the carriage in the letter-spacing direction will cause the carriage-mounted rack rod 74 to move relatively to and alongside the toothed portion 67 of the rod 65. This will cause the pinion 76 to roll on the toothed portion 67 of the rod 65, thereby moving together with the carriage in the letter-spacing direction but at only a fraction of the speed of the carriage, specifically, at one-half the speed of the carriage. This compound or differential movement of the pinion 76 is transmitted through the link 49 to the lever 35, rocking the latter counterclockwise as viewed in Figure 1 about its pivot 36. Such rocking of the lever 35 moves the bar 30 and rack 14 relatively to the carriage opposite the direction of letter-spacing carriage travel to increase each of the letter-spacing increments and thereby effect the desired line justification. Justifying mechanism embodying the present invention is especially suited for use in typewriters having a long platen and consequent long carriage travel. It has been ascertained that very long typed lines can be justified in a manner to produce a neat appearance by effecting the justification in or confining it to only a part of the typed line instead of distributing the justification throughout the entire typed line. A further feature of the invention resides in providing mechanism for confining the justification to or within a predetermined portion of a typed line, thereby making it possible to reduce the sizes and weights of several of the parts, resulting in the provision of a typewriting machine which is light and compact. The differential drive mechanism embodied in the present invention is so constructed that the pinion 76 moves relatively to the carriage during only a portion of the letter-spacing travel, and during the remaining part of the travel remains fixed with respect to the carriage and moves in unison therewith. When, during carriage letter-spacing movement, the parts reach the positions shown in Figure 3, the rack 74 will be longitudinally offset from the toothed portion 67 of the rod 65 and the pinion will be just ready to become disengaged from the toothed portion 67 of the rod 65. In order thereafter to maintain the pinion in fixed position with respect to the carriage, means are provided for holding the pinion against rolling on the rack 74 as soon as the pinion leaves the toothed portion 67 of the rod 68. In the form shown, the bracket 56 is extended upwardly at 85 for the reception of screws 86 which secure to the bracket extension a trackway 87 extending above and parallel to the rack 74. The top retainer 81 on the pinion 76 has an upturned ear forming a shoe part 88 which is rotatable with the pinion and eccentric to the pintle axis. When the parts reach the positions shown in Figure 3, the shoe 88 will move around behind the trackway 87 to the position shown in Figure 5.

As the carriage continues on its letter-spacing movement, the shoe 88 will slide on the trackway 87 and will be prevented thereby from turning, thus locking and positively holding the pinion and drive member 49 in fixed position on and relative to the carriage. When the carriage is moved on a return stroke, engagement of the pinion 76 with the toothed portion of the rack 67 will tend to rotate the pinion in a counterclockwise direction, as viewed in Figure 3. This will take place at the moment the shoe 88 has been projected sufficiently beyond the end of the trackway 87 to permit the shoe's being swung around the end of the trackway with accompanying rotation of the pinion.

In order that the parts may be timed nicely, so that the lever 35 and rack 14 work within a predetermined range, the link 49 is arranged to be adjusted as to length. To this end, the link is formed to include a main portion 49$^a$ and adjustable short portion 49$^b$ formed with slots 49$^c$ through which extend locking screws 49$^d$ having threaded connection with the main link portion 49$^a$.

The coaction of the parts in operation has been set forth above, but consideration of the different distances moved by different parts during different stages of the carriage letter-spacing travel will assist in understanding the novel functional effect of the driving mechanism.

Before the typing of a line is commenced, the point $x$ on the platen is positioned opposite the printing point. During the first stage of letter-spacing travel, the carriage will move through the distance F until the point $x^1$ on the platen is disposed opposite the printing point. During this stage, the carriage will travel twice as fast as and twice as far as the pinion 76 which travels through the distance A to the position indicated in dotted lines in Figure 1 just to the right of its full line position wherein the pinion is just ready to leave the toothed portion 67 of the rod 65, and the shoe 88 is about to move behind the trackway 87. At the same time, the carriage end plate 6 moves through the distance C which, of course, is equal to the distance F. It is during this first phase of carriage letter-spacing travel that the space justification is effected. During the next phase of the carriage travel, the pinion 76 no longer operatively engages the rod 65, and is maintained against rolling on the rod 74 by engagement of the shoe 88 with the trackway 87. Consequently, the pinion 76 will move through the distance B while the carriage is moving through the distance E until the point $x^2$ on the platen arrives opposite the printing point. At the same time, the end plate 6 will move through the distance D. During return movement of the carriage, the pinion 76 will operatively re-engage the toothed portion 67 of the rod 65 when the carriage has moved through the distance E and the point $x^1$ on the platen has arrived at the printing point. During the remainder of the carriage return movement, represented by the distance F, the pinion will have operative rolling contact with the toothed portion 67 of the rod 65, and with the rack 74, thereby moving the link 49 relatively to the carriage to return the lever 35 to its starting position. It will be apparent that the compound movement of the member 49 at a fraction of the speed of the carriage is due to the differential rolling of the pinion 76 upon the rods 65 and 74. In a broad sense, the pinion 76 constitutes a roller which is adapted simultaneously to engage spaced parallel trackways 67 and 74 mounted respectively on the frame and carriage. The use of toothed trackways and a toothed pinion is preferred because the intermeshing toothed elements assure maintenance of proper timing of the parts.

As explained in the Handley Patent 2,196,437, referred to above, the differential letter-spacing movement of the carriage necessary to accomplish justification of a typed line depends in part on the length of the line, less differential step movement being required in justifying a relatively long line than is required in justifying a relatively short line. Variations in the differential carriage movement to suit different conditions may be effected by shifting the rack plate 38 and thereby shifting the point 36 at which the operating lever 35 is pivoted on the carriage. By shifting the plate 38 it is possible to vary the ratio of the distance between the pivot 50 and the pivot 47 and the distance between the pivot 50 and the pivot 36.

Adjusting means are provided for shifting the rack plate 38 to control the amount of differential or justifying movement of the carriage and escapement rack 14. The control means shown herein is generally similar to control means employed for the same purpose in the structure shown in the Handley Patent 2,196,437. However, the control means shown herein provides for closer adjustments, it being possible to select the best or most suitable differential letter spacing for lines of four, four and one-half, five, five and one-half, six, six and one-half, and seven, or more inches in length whereas the control means shown in the prior patent is adapted for selection according to lines of four, five, six and seven inches in length. For supporting the control means shown herein an upper bracket 89 is secured by a screw 90 and nut 91 to the carriage end plate 6 and is braced by a post 92 secured to the bracket 24 by a nut 93.

A single rotary control element 94 is employed for varying the justified carriage step movement to meet the conditions incident to justifying copies of different line lengths. The control element 94 includes a vertical shaft 95 which is journaled in the brackets 24 and 89. Fixed to the lower end of the shaft is a pinion 96 which is in constant mesh with the rack teeth of the rack plate 38, and functions upon rotation of the shaft to move the rack plate longitudinally, thereby shifting the carriage pivot 36 towards or from the rack bar pivot 47. Fixed to the shaft 95 below the upper bracket 89 is a space-indicating cylinder 97. The periphery of the cylinder is provided with a plurality of circumferential series $a$, $b$, $c$, $d$, $e$, $f$, and $g$ of justifying space indicating numerals, the series being arranged one above the other. The numerals of each series are equally spaced, but the numerals vary in number in the different series and consequently the spacing between the numerals of one series is different from the spacing between the numerals of the other series. The series, reading downwardly, are respectively co-related to lines of four inch length, four and one-half inch length, five inch length, five and one-half inch length, six inch length, six and one-half inch length, and seven inch length. The series $a$ comprises the numerals 0, 1, 2, 3, 4; each of the series $b$ and $c$ comprises the numerals 0, 1, 2, 3, 4, 5; each of the series $d$ and $e$ comprises the numerals 0, 1, 2, 3, 4, 5, 6; and each of the series $f$ and $g$ comprises the numerals 0, 1, 2, 3, 4, 5, 6, 7. The numerals 0 of all the series are vertically aligned.

A spring arm 98 is pivoted on an upstanding lug 99 of the bracket 89 located in rear of the control element 94, the pivot being formed by a horizontal clamping screw 100 engageable in the lug 99. The arm extends forwardly above and on the right of the cylinder 97, and pivotally supported on the forward end of said arm by a horizontal pivot pin 101 is a swingable pointer arm 102 having a pointer finger 103 which projects laterally in front of the cylinder 97, the end of the finger being positioned centrally of the cylinder. Thus, when the spring arm 98 is swung upwardly or downwardly the pointer arm 102 will always maintain a vertical position and the pointer finger will always cooperate properly with the series of numerals on the cylinder 97.

In order to assist the operator in positioning the pointer finger 103 in cooperative relation with any one of the series a, b, c, d, e, f, or g of numerals, the bracket 89 is formed to provide a vertically disposed indicator plate 104. On the front face of this plate 104 are indicia which consist of a vertical series of spaced horizontal lines and associated numerals "4"; "4½"; "5"; "5½"; "6"; "6½"; and "7." The lines are vertically spaced to conform to the spaces between the series a, b, c, d, e, f and g of the justifying space indicating numerals located on the cylinder 97. A pointer 105 extends laterally from the front end of the arm 98 and is adapted to be placed in registration with any of said lines upon upward or downward movement of said arm. When the pointer 103 registers with any of the numerals "0" on the cylinder 97, the carriage pivot 36 will be disposed in axial alignment with the rack bar pivot 47 and in this position a normal step movement will be imparted to the carriage by the escapement mechanism.

In operation, if it is desired to reproduce an unjustified line to justified length, the arm 98 is moved upwardly or downwardly until the pointer 105 registers with the desired line length indicia on the plate 104. This movement simultaneously shifts the pointer 103 into registration with the corresponding series of justifying space indicating numerals on the cylinder 97. The operator having previously ascertained the number of character spaces to be compensated for in effecting the justification, rotates the control element 97 until the proper numeral is positioned in registry with the pointer 103. This movement of the control element 94 causes the carriage pivot 36 to be adjusted either toward or from the rack bar pivot 47 whereby the distance between said pivots will be such as to cause the necessary justifying step movement to be imparted to the carriage.

For releasably locking the control element 94 in its adjusted position a cylinder 106 is secured to the shaft 95 above the upper bracket 89. The cylinder 106 is provided with a plurality of circumferential series a', b', c', d', e', f', and g' of openings 107; the several series being arranged one above the other and the openings of each series being circumferentially spaced. The numbers of openings in the different series varies, there being five openings in the series a'; six openings in each of the series b' and c'; seven openings in each of the series d' and e'; and eight openings in each of the series f' and g'. The series of openings a', b', c', d', e', f', and g' are spaced from each other vertically corresponding to the spacing of the series of indicia a, b, c, d, e, f and g on the cylinder 97. The pivot pin 101 for the pointer arm 102 is rigidly secured to the arm 98 and the inner end of the pin projects toward the cylinder 106 to form a locking pin 108 which is adapted to be seated within any of the openings 107 and thereby lock the rotatable control element 94 in adjusted position. When it is desired to adjust the element 94, the operator withdraws the locking pin 108 from its associated opening, swings the arm 98 upwardly or downwardly to the desired position, turns the control element 94 until the desired character space numeral on the cylinder 97 registers with the pointer 103, and then releases said locking pin whereby the latter will become seated in the associated opening 107.

For limiting downward movement of the arm 98, the top bracket 89 is extended at 109 to provide a stop engageable by the arm, thereby preventing the arm from being accidentally moved too far down. The stop portion 109 is extended vertically at 110 and thence horizontally at 111 above the arm 98 to prevent the arm's being moved too far upwardly.

The construction disclosed herein embodies the invention in the form now preferred but it will be apparent that structural changes may be made without departing from the invention as defined in the claims.

I claim:

1. In a typewriter or like machine, a frame; a carriage mounted thereon for letter spacing movements; carriage escapement mechanism including a rack bar mounted on the carriage; and means for effecting longitudinal movement of the rack bar relative to the carriage including a lever, a pivotal connection between said lever and said carriage, a pivotal connection between said lever and said rack bar, a driving member connected to said lever, means mounting said driving member for compound movement bodily together with said carriage and simultaneously bodily and substantially rectilinearly with respect to said carriage and parallel to the carriage movement, and means for effecting movement of said driving member bodily and substantially rectilinearly with respect to said carriage and parallel to the carriage movement in response to letter-spacing movement of said carriage on said frame.

2. In a typewriter or like machine, a frame; a carriage element mounted thereon for letter spacing movements; carriage escapement mechanism including a rack bar element mounted on the carriage element; and means for effecting longitudinal movement of the rack bar element relative to the carriage element including a lever, a pivotal connection between said lever and said carriage element, a pivotal connection between said lever and said rack bar element, one of said pivotal connections also being constructed to provide for relative sliding between said lever and the one of said elements to which it is connected by said one of said pivotal connections, a driving member connected to said lever, means mounting said driving member for compound movement bodily together with said carriage element and simultaneously bodily and substantially rectilinearly with respect to said carriage element, and means for effecting movement of said driving member bodily and substantially rectilinearly with respect to said carriage element in response to letter-spacing movement of said carriage element on said frame.

3. In a typewriter or like machine, a frame; a carriage mounted thereon for letter-spacing movements; carriage escapement mechanism including a rack bar mounted on the carriage; and means for effecting longitudinal movement of the rack bar relative to the carriage including a lever, a pivotal connection between said lever and said carriage, a combined pivotal and sliding connection between said lever and said rack bar, a driving member connected to said lever, means mounting said driving member for compound movement bodily together with said carriage and simultaneously bodily and substantially rectilinearly with respect to said carriage, and means for effecting movement of said driving member bodily and substantially rectilinearly with respect to said carriage in response to letter-spacing movement of said carriage on said frame.

4. In a typewriter or like machine, a frame; a carriage mounted thereon for letter-spacing movements; carriage escapement mechanism including a rack bar mounted on the carriage; means for effecting longitudinal movement of the rack bar relative to the carriage including a lever, a pivotal connection between said lever and said carriage, a pivotal connection between said lever and said rack bar, a driving member connected to said lever, means mounting said driving member for compound movement bodily together with said carriage and simultaneously bodily and substantially rectilinearly with respect to said carriage, and means for effecting movement of said driving member bodily and substantially rectilinearly with respect to said carriage in response to letter-spacing movement of said carriage on said frame; and adjusting means for varying the ratio of the distance between said pivotal connections to the distance between the first specified pivotal connection and the connection of said lever to said driving member.

5. In a typewriter or like machine, a frame; a carriage mounted thereon for letter-spacing movements; carriage escapement mechanism including a rack bar mounted on the carriage; and means for effecting longitudinal movement of the rack bar relative to the carriage including a slotted lever, a pivotal connection between said lever and said carriage, a pivot pin on said rack bar extending into the slot in said lever, a driving member connected to said lever, means mounting said driving member for compound movement bodily together with said carriage and simultaneously bodily and substantially rectilinearly with respect to said carriage, a link pivotally connected at its opposite ends respectively to said pin and said driving member, and means for effecting movement of said driving member bodily and substantially rectilinearly with respect to said carriage in response to letter-spacing movement of said carriage on said frame.

6. In a typewriter or like machine, a frame; a carriage mounted thereon for letter-spacing movements; carriage escapement mechanism including a rack bar mounted on the carriage; and means for effecting longitudinal movement of the rack bar relative to the carriage including a lever which traverses said rack bar, a pivotal connection between one end of said lever and said carriage, said lever being slotted at its opposite end and also where it traverses said rack bar, a pin connected to said rack bar and extending into the lever slot traversing said rack bar, a driving member, means mounting said driving member for compound movement bodily together with said carriage and simultaneously bodily with respect to said carriage, a pin carried by said driving member and extending into the slot at said opposite end of the lever, a link between said pins, and means for effecting movement of said driving member bodily with respect to said carriage in response to letter-spacing movement of said carriage on said frame.

7. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending trackway on said frame, a companion trackway on said carriage parallel to and spaced from said frame trackway, a roller adapted to be interposed between and to operatively engage both said trackways, and means connecting said roller to said operating member.

8. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending toothed trackway on said frame, a companion toothed trackway on said carriage parallel to and spaced from said frame toothed trackway, a pinion adapted to be interposed between and to operatively engage both said toothed trackways, and means connecting said pinion to said operating member.

9. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending trackway on said frame, a companion trackway on said carriage parallel to and spaced from said frame trackway, a roller adapted to be interposed between and to operatively engage both said trackways, said trackways being of such lengths and being so positioned on the frame and carriage respectively that said roller can engage both said trackways simultaneously throughout only a part of the carriage letter-spacing travel, the trackways being longitudinally offset relative to each other throughout the other part of the carriage letter-spacing travel, means for holding said roller fixed with respect to the trackway on said carriage throughout said other part of the carriage letter-spacing movement, and means connecting said roller to said operating member.

10. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending trackway on said frame, a companion trackway on said carriage parallel to and spaced from said frame trackway, a roller adapted to be interposed between and to operatively engage both said trackways, and a connection between said roller and said operating member, said connection comprising adjusting means for varying the distance between said roller and said operating member.

11. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending first trackway on said frame, a second and companion trackway on said carriage parallel to and spaced from said first trackway, a roller adapted to be interposed between and to operatively engage both said trackways simultaneously, said first and second trackways being of such lengths and being so positioned on the frame and carriage respectively that said roller can engage both said trackways simultaneously throughout only a part of the carriage letter-spacing travel, said first and second trackways being longitudinally offset relative to each other throughout the other part of the carriage letter-spacing travel, a third trackway on said frame parallel to said first and second trackways, a part mounted on and rotatable with said roller eccentric to the axis thereof and being engageable with said third trackway when said first and second trackways become longitudinally offset from each other to prevent rolling of said roller on said second trackway to thereby hold the roller in fixed position longitudinally of the carriage, and means connecting said roller to said operating member.

12. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending first trackway on said frame, a second and companion trackway on said carriage parallel to and spaced from said first trackway, a roller adapted to be interposed between and to operatively engage both said trackways simultaneously, said first and second trackways being of such lengths and being so positioned on the frame and carriage respectively that said roller can engage both said trackways simultaneously throughout only a part of the carriage letter-spacing travel, said first and second trackways being longitudinally offset relative to each other throughout the other part of the carriage letter-spacing travel, a third trackway on said frame parallel to said first and second trackways, a shoe mounted on and rotatable with said roller eccentric to the axis thereof and being slidably engageable with said third trackway when said first and second trackways become longitudinally offset from each other to prevent rolling of said roller on said second trackway to thereby hold the roller in fixed position longitudinally of the carriage, and means connecting said roller to said operating member.

13. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending first toothed trackway on said frame, a second and companion toothed trackway on said carriage parallel to and spaced from said first trackway, a pinion adapted to be interposed between and to operatively engage both said trackways simultaneously, said first and second trackways being of such lengths and being so positioned on the frame and carriage respectively that said pinion can engage both said trackways simultaneously throughout only a part of the carriage letter spacing travel, said first and second trackways being longitudinally offset relative to each other throughout the other part of the carriage letter-spacing travel, a third trackway on said frame parallel to said first and second trackways, a part mounted on and rotatable with said pinion eccentric to the axis thereof and being engageable with said third trackway when said first and second trackways become longitudinally offset from each other to prevent rolling of said pinion on said second trackway to thereby hold the pinion in fixed position longitudinally of the carriage, and means connecting said pinion to said operating member.

14. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating member mounted on the carriage, means connecting the operating member to the rack bar, a longitudinally extending rod on said frame, a rod on said carriage parallel to the rod on said frame, adjacent sides of said rods providing spaced parallel trackways, a roller adapted to be interposed between and to operatively engage both said trackways simultaneously, an axle for said roller, retainers mounted respectively at opposite ends of said axle and engaging opposed faces of said rods for holding said roller against lateral displacement from between said trackways, and means connecting said axle to said operating member.

15. In a typewriter or like machine, a frame; a carriage mounted thereon for letter-spacing movements; carriage escapement mechanism including a rack bar mounted on the carriage; and means for effecting longitudinal movement of the rack bar relative to the carriage including an operating lever pivotally mounted on the carriage, means connecting said lever to said rack, a differential drive mechanism including an element movable in response to carriage letter-spacing travel parallel to the direction of letter spacing travel at a fraction of the speed of the carriage, and means connecting said element to said lever.

16. In a typewriter or like machine, a frame; a carriage mounted thereon for letter-spacing movements; carriage escapement mechanism including a rack bar mounted on the carriage; and means for effecting longitudinal movement of the rack bar relative to the carriage including a lever, a pivotal connection between said lever and said carriage, a pivotal connection between said lever and said rack bar, a longitudinally extending trackway on said frame, a companion trackway on said carriage parallel to and spaced from said frame trackway, a roller adapted to be interposed between and to operatively engage both said trackways simultaneously, and a link connecting said roller to said lever.

17. In a typewriter or like machine, a frame; a carriage mounted thereon for letter-spacing movements; carriage escapement mechanism including a rack bar mounted on the carriage; and means for effecting longitudinal movement of the rack bar relative to the carriage including a lever, a pivotal connection between said lever and said carriage, a pivotal connection between said lever and said rack bar, a longitudinally extending toothed trackway on said frame, a companion toothed trackway on said carriage parallel to and spaced from said frame trackway, a pinion adapted to be interposed between and to operatively engage both said trackways simultaneously, and a link connecting said pinion to said lever.

18. In a typewriter or like machine, a frame; a carriage mounted thereon for letter-spacing movements; carriage escapement mechanism including a rack bar mounted on the carriage; and means for effecting longitudinal movement of the rack bar relative to the carriage including a lever, a pivotal connection between said lever and said carriage, a combined pivotal and sliding connection between said lever and said rack bar, a longitudinally extending trackway on said frame, a companion trackway on said carriage parallel to and spaced from said frame trackway, a roller adapted to be interposed between and to operatively engage both said trackways simultaneously, and a link connecting said roller to said lever.

19. In a typewriting or like machine, a frame; a carriage mounted thereon for letter-spacing and return movements; carriage escapement mechanism for controlling step-by-step letter-spacing movements of the carriage and adapted normally to fix a predetermined length of each step movement; and justifying mechanism cooperable with said escapement mechanism and operable during only a portion of the carriage letter-spacing movement for fixing for each step movement a length different from said predetermined step length, said justifying mechanism including a part on said frame, a drive device operatively engageable with said part during only said portion of the carriage letter-spacing movement for thereby being moved with respect to the carriage, and means including parts respectively on said device and said frame operatively engageable with each other only during said portion of the said carriage movement for preventing movement of said device relatively to said carriage during the remainder of carriage letter-spacing movement.

GEORGE F. HANDLEY.